(12) United States Patent
Hsu et al.

(10) Patent No.: US 11,691,213 B2
(45) Date of Patent: *Jul. 4, 2023

(54) METHODS AND APPARATUS TO DETERMINE AND DISPLAY HEAT INPUT TO A WELD

(71) Applicant: Illinois Tool Works Inc., Glenview, IL (US)

(72) Inventors: Christopher Hsu, Appleton, WI (US); Jake Zwayer, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 617 days.

This patent is subject to a terminal disclaimer.

(21) Appl. No.: 16/860,588

(22) Filed: Apr. 28, 2020

(65) Prior Publication Data

US 2020/0254555 A1    Aug. 13, 2020

Related U.S. Application Data

(63) Continuation of application No. 15/461,251, filed on Mar. 16, 2017, now Pat. No. 10,632,557.

(51) Int. Cl.
*B23K 9/10* (2006.01)
*B23K 9/095* (2006.01)

(52) U.S. Cl.
CPC .......... *B23K 9/1006* (2013.01); *B23K 9/0953* (2013.01)

(58) Field of Classification Search
CPC .......................... B23K 9/1006; B23K 9/0953
USPC .................................................. 219/130.21
See application file for complete search history.

(56) References Cited

U.S. PATENT DOCUMENTS

| | | |
|---|---|---|
| 5,825,038 A | 10/1998 | Blake |
| 5,932,123 A | 8/1999 | Marhofer |
| 6,552,303 B1 | 4/2003 | Blankenship |
| 6,730,875 B2 | 5/2004 | Hsu |
| 7,091,445 B2 | 8/2006 | Myers |
| 7,573,002 B2 | 8/2009 | Myers |
| 7,683,290 B2 | 3/2010 | Daniel |
| 8,410,398 B2 | 4/2013 | Daniel |
| 9,333,582 B2 | 5/2016 | Daniel |
| 2007/0114215 A1 | 5/2007 | Bill |
| 2009/0184098 A1 | 7/2009 | Daniel |
| 2011/0284500 A1 | 11/2011 | Rappl |
| 2013/0119037 A1 | 5/2013 | Daniel |

(Continued)

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

Methods and apparatus to determine heat input to a weld are disclosed. An example welding-type power supply includes a power converter to convert input power to output welding-type power, and a controller configured to: during a welding-type operation, calculate average instantaneous power values of the welding-type operation for discrete, non-overlapping time periods by multiplying voltage measurements and corresponding current measurements; identify an end of the welding-type operation; determine a duration of the welding-type operation; calculate a total average instantaneous power of the welding-type operation based on the average instantaneous power values for the time periods and the duration of the welding-type operation; and determine whether an acceptable range of the welding-type operation is exceeded based on the total average instantaneous power and the duration of the welding-type operation.

20 Claims, 5 Drawing Sheets

(56) References Cited

U.S. PATENT DOCUMENTS

| | | |
|---|---|---|
| 2014/0021182 A1 | 1/2014 | Peters |
| 2014/0124492 A1 | 5/2014 | Daniel |
| 2015/0134292 A1 | 5/2015 | Ignatowski |
| 2015/0151383 A1 | 6/2015 | Hillen |

METHODS AND APPARATUS TO DETERMINE AND DISPLAY HEAT INPUT TO A WELD

BACKGROUND

This disclosure relates generally to welding and, more particularly, to methods and apparatus to determine heat input to a weld.

Conventional welding equipment displays instantaneous power on the user interface, where it is can be difficult for user to track changes of power throughout the weld and to measure overall heat input into a weld. This is even more difficult if the user is also responsible for performing the weld. Other conventional welding equipment displays accumulated energy as the weld progresses, but the display is not friendly to track changes of heat input based on location within a weld.

SUMMARY

Methods and systems are provided for determining and displaying heat input to a weld, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Disclosed example welding-type power supplies monitor first value average instantaneous power values for discrete, non-overlapping time periods during a welding-type operation, and output representative instantaneous power values during the welding-type operation and at the conclusion of the welding-type operation for use in determining that total heat input to the weld from the welding-type operation.

As used herein, the term "welding-type power" refers to power suitable for welding, plasma cutting, induction heating, CAC-A and/or hot wire welding/preheating (including laser welding and laser cladding). As used herein, the term "welding-type power supply" refers to refers to a power supply that can provide welding-type power.

As used herein, the term "instantaneous" refers to a short time period, such as a time period equal to a time period between voltage and current sampling times. In some examples, the term "instantaneous" refers to the smallest indivisible time unit of which the power supply is capable of capturing voltage and/or current samples.

Figure 1:
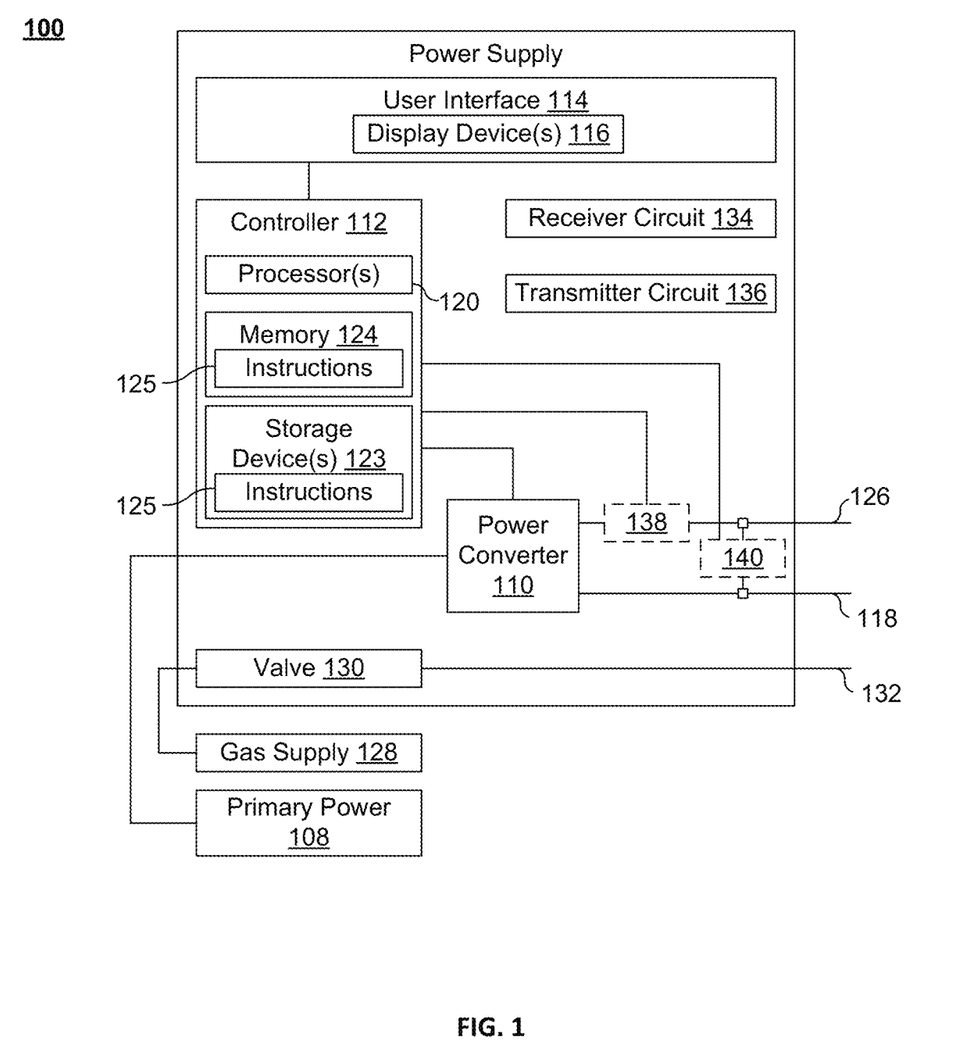
FIG. 1 is a block diagram of an example welding-type power supply, in accordance with aspects of this disclosure.

FIG. 1 is a block diagram of an example welding-type power supply 100. The example power supply 100 powers, controls, and supplies consumables to a welding application. In some examples, the power supply 100 directly supplies input power to a welding torch. In the illustrated example, the welding-type power supply 100 is configured to supply power to welding operations and/or preheating operations. The example welding-type power supply 100 also provides power to a wire feeder to supply electrode wire to the welding torch for various welding applications (e.g., GMAW welding, flux core arc welding (FCAW)).

The power supply 100 receives input power 108 (e.g., from the power grid, an engine/generator set, a battery, or other energy generating or storage devices, or a combination thereof), conditions the primary power, and provides an output power to one or more welding devices and/or preheating devices in accordance with demands of the system. The input power 108 may be supplied from an offsite location (e.g., the primary power may originate from the power grid). The welding-type power supply 100 includes a power converter 110, which may include transformers, rectifiers, switches, and so forth, capable of converting the AC input power to AC and/or DC output power as dictated by the demands of the system (e.g., particular welding processes and regimes). The power converter 110 converts the input power 108 to welding-type power based on a weld voltage setpoint and outputs the welding-type power via a weld circuit.

In some examples, the power converter 110 is configured to convert the primary power to both welding-type power and auxiliary power outputs. However, in other examples, the power converter 110 is adapted to convert primary power only to a weld power output, and a separate auxiliary converter is provided to convert primary power to auxiliary power. In some other examples, the power supply 100 receives a converted auxiliary power output directly from a wall outlet. Any suitable power conversion system or mechanism may be employed by the power supply 100 to generate and supply both weld and auxiliary power.

The power supply 100 includes a controller 112 to control the operation of the power supply 100. The welding-type power supply 100 also includes a user interface 114. The controller 112 receives input from the user interface 114, through which a user may choose a process and/or input desired parameters (e.g., voltages, currents, particular pulsed or non-pulsed welding regimes, and so forth). The user interface 114 may receive inputs using any input device, such as via a keypad, keyboard, buttons, touch screen, voice activation system, wireless device, etc. Furthermore, the controller 112 controls operating parameters based on input by the user as well as based on other current operating parameters. Specifically, the user interface 114 may include one or more display device(s) 116 for presenting, showing, or indicating, information to an operator. The controller 112 may also include interface circuitry for communicating data to other devices in the system, such as the wire feeder. For example, in some situations, the power supply 100 wirelessly communicates with other welding devices within the welding system. Further, in some situations, the power supply 100 communicates with other welding devices using a wired connection, such as by using a network interface controller (NIC) to communicate data via a network (e.g., ETHERNET, 10baseT, 10base100, etc.).

While the user interface 114 and the display device(s) 116 are shown in FIG. 1 as part of the power supply 100, in other examples another component of a welding system includes the user interface 114 and/or the display device(s) 116 and the power supply 100 may omit or disable the user interface 114 and/or the display device(s) 116. For example, the display device(s) 116 may be separate from the power supply 100, such as a heads up display inside of a welding helmet visor, light projection from the welding torch body onto the workpiece, and/or any other display or projection method. Additionally or alternatively, information may be output via audio means, such as speakers, audio via bone conduction through a welding helmet, or any other techniques for providing audio during welding.

The controller 112 includes at least one controller or processor 120 that controls the operations of the welding-type power supply 100. The controller 112 receives and processes multiple inputs associated with the performance and demands of the system. The processor 120 may include one or more microprocessors, such as one or more "general-purpose" microprocessors, one or more special-purpose microprocessors and/or ASICS, reduced instruction set (RISC) processors, field programmable gate arrays (FPGAs), and/or any other type of processing device. For example, the processor 120 may include one or more digital signal processors (DSPs).

The example controller 112 includes one or more storage device(s) 123 and one or more memory device(s) 124. The storage device(s) 123 (e.g., nonvolatile storage) may include ROM, flash memory, a hard drive, and/or any other suitable optical, magnetic, and/or solid-state storage medium, and/or a combination thereof. The storage device 123 stores data (e.g., data corresponding to a welding application), instructions (e.g., software or firmware to perform welding processes), and/or any other appropriate data. Examples of stored data for a welding application include an attitude (e.g., orientation) of a welding torch, a distance between the contact tip and a workpiece, a voltage, a current, welding device settings, and so forth.

The memory device 124 may include a volatile memory, such as random access memory (RAM), and/or a nonvolatile memory, such as read-only memory (ROM). The memory device 124 and/or the storage device(s) 123 may store a variety of information and may be used for various purposes. For example, the memory device 124 and/or the storage device(s) 123 may store processor executable instructions 125 (e.g., firmware or software) for the processor 120 to execute. In addition, one or more control regimes for various welding processes, along with associated settings and parameters, may be stored in the storage device 123 and/or memory device 124, along with code configured to provide a specific output (e.g., initiate wire feed, enable gas flow, capture welding current data, detect short circuit parameters, determine amount of spatter) during operation.

In some examples, the welding power flows from the power converter 110 through a weld cable 126 and/or a work cable 118. The example weld cable 126 is attachable and detachable from weld studs at each of the welding-type power supply 100 (e.g., to enable ease of replacement of the weld cable 126 in case of wear or damage). In this manner, the weld cable 126 may be utilized to provide welding power from the welding-type power supply 100 to the wire feeder and the welding torch. Additionally or alternatively, the weld cable 126 may be used to transmit and/or receive data communications to/from the wire feeder and the welding torch.

Among other things, the controller 112 calculates a total average instantaneous power to a weld and the duration of the weld and outputs both the total average instantaneous power and the duration of the welding operation. The total average instantaneous power and the duration of the welding operation may be used, for example, to determine a total heat input or total power input to a weld and/or to determine compliance with a specified total heat input (e.g., as specified in a weld procedure specification or procedure qualification record).

To calculate the total average instantaneous power to the weld, the controller 112 identifies a start of a welding-type operation, such as by identifying the initiation of current flow or identifying a weld torch trigger pull. During the welding-type operation, the controller 112 calculates average instantaneous power values of the welding-type operation for discrete, non-overlapping time periods. In some examples, the discrete time periods corresponding to a refresh rate of the user interface 114 and/or the display device(s) 116, where the controller 112 calculates and/or updates welding-type parameters for display during the welding-type operation (e.g., voltage, current, wire feed speed, heat input, power input, etc.).

To calculate average instantaneous power values for a time period, the controller 112 calculates individual instantaneous power values from corresponding voltage measurements and current measurements. For example, the controller 112 multiplies a first voltage measurement corresponding to a first time during a time period by a first current measurement corresponding to the first time to determine a first power measurement, multiplies a second voltage measurement corresponding to a second time during the time period by a second current measurement corresponding to the second time to determine a second power measurement, and so forth. The controller 112 performs multiple instantaneous power value calculations during a discrete time period and, at the conclusion of the time period or on an ongoing basis, calculates the average instantaneous power value for the time period.

The controller 112 calculates a total average instantaneous power input (or heat input) to the weld by summing the average instantaneous power input values for the discrete time periods for the duration of the weld. After determining the total average instantaneous power input, the controller 112 outputs the total average instantaneous power input and the duration of the weld (e.g., by tracking the time since the weld started). For example, the controller 112 may display the total average instantaneous power input and the duration of the weld via one or more of the display device(s) 116. The display device(s) 116 may simultaneously, alternately, or sequentially display the total average instantaneous power input and the duration.

In addition or as an alternative to calculating the total average instantaneous power, the example controller 112 calculates a net average instantaneous power as an overall average of the average instantaneous power input values. Where the average instantaneous power values are calculated for equal time periods, net average instantaneous power may be a simple average of the average instantaneous power values. Conversely, if the average instantaneous power values are determined for unequal time periods, the controller 112 may weight each of the average instantaneous power values according to the corresponding durations of the time periods and/or the number of samples used to determine the average instantaneous power values. The example controller 112 displays the net average instantaneous power via the display device(s) 116 instead of or in addition to the total average instantaneous power.

In some examples, after displaying the total average instantaneous power input and the duration of the weld for a predetermined time (e.g., sufficient time for the welder to copy down the data to another medium or otherwise use the displayed information), the controller 112 reverts to displaying other information such as weld parameters for a next weld. The controller 112 may enable the user to toggle the display of the total average instantaneous power input and/or the duration of the weld after the display has changed from displaying the power input and duration information.

By calculating and outputting the total average instantaneous power input, the net average instantaneous power input, and/or the duration of the weld, the power supply 100 assists end users and/or fabricators by measuring heat input, such as when developing PQRs and/or WPSs, keeping track of instantaneous heat input as welds are performed, and/or displaying useful information at the completion of weld for a user to calculate heat input to comply with applicable welding codes (e.g., AWS/ASME codes).

In some examples, a gas supply 128 provides shielding gases, such as argon, helium, carbon dioxide, and so forth, depending upon the welding application. The shielding gas flows to a valve 130, which controls the flow of gas, and if desired, may be selected to allow for modulating or regulating the amount of gas supplied to a welding application. The valve 130 may be opened, closed, or otherwise operated by the controller 112 to enable, inhibit, or control gas flow (e.g., shielding gas) through the valve 130. Shielding gas exits the valve 130 and flows through a composite cable 132 (which in some implementations may be packaged with the welding power output) to the wire feeder which provides the shielding gas to the welding application. In some examples, the welding-type power supply 100 does not include the gas supply 128, the valve 130, and/or the cable 132.

The example welding-type power supply 100 of FIG. 1 may also include a receiver circuit 134 and/or a transmitter circuit 136. The receiver circuit 134 receives communications including measurements the weld output voltage and/or the weld output current. The example receiver circuit 134 may receive measurements via analog and/or digital communication channels, which may be wired and/or wireless. For example, the receiver circuit 134 may receive the voltage and/or current measurements from a separate wire feeder and/or from an external meter connected to the weld circuit, via a communications cable, via communications over the weld circuit, via power line communications (over the composite cable 132 and/or any other power cable), via wireless communications, and/or any other communications channel. Additionally or alternatively, the current measurements used by the controller 112 may be measured by a current sensor 138 in the power supply 100, and/or the voltage measurements used by the controller may be measured by a voltage sensor 140 in the power supply 100.

The transmitter circuit 136 transmits data to external devices over a network, such as computing devices or data storage devices. In some examples, in addition to displaying average instantaneous weld power values, total average instantaneous weld power values, and/or weld durations via the display device(s) 116 during and/or following a weld operation, the transmitter circuit 136 transmits average instantaneous weld power values, total average instantaneous weld power values, weld durations, and/or any other data to a weld data repository via a network. In some examples, the receiver circuit 134 is configured to receive data or commands via the network.

In some examples, the user interface 114 enables the user to navigate the average instantaneous power values for individual ones of the discrete time periods during a weld. For example, as a user operates a dial, the display device(s) 116 display an average instantaneous power value that occurred during a weld (e.g., the most recent weld, a historical weld) and a discrete time period for which the displayed average instantaneous power value to which the average instantaneous power value applies. By navigating the discrete time periods, the user may identify any time periods in which excessively high or low heat input occurs.

Figure 2A:
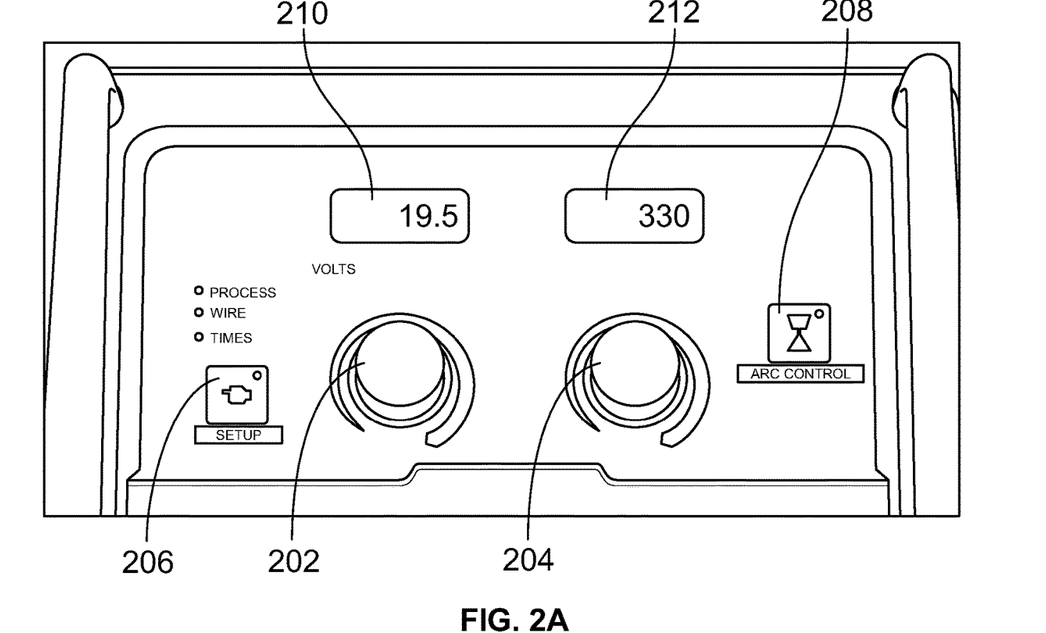
FIG. 2A illustrates an example interface for a welding-type power supply displaying welding parameters, in accordance with aspects of this disclosure.

FIG. 2A illustrates an example interface 200 for the welding-type power supply 100 of FIG. 1 while displaying welding parameters. The example interface 200 includes one or more user interface devices 202, 204, 206, 208 (e.g., knobs, switches, buttons, etc.) and multiple display devices 210, 212 (e.g., LED displays, LCD displays, etc.). As illustrated in FIG. 2A, the display devices 210, 212 output weld parameter values (e.g., weld voltage, weld current, wire feed speed, etc.), which may be displayed prior to a weld.

Figure 2B:
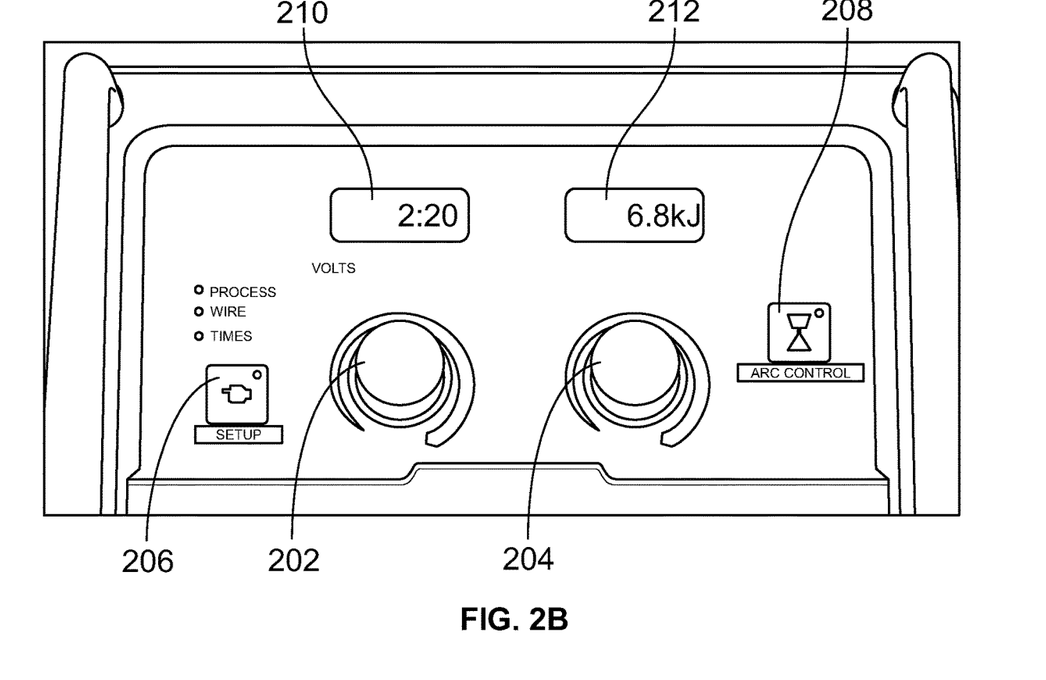
FIG. 2B illustrates the example interface for the welding-type power supply displaying a total average instantaneous power of a welding-type operation and a duration of the welding-type operation.

FIG. 2B illustrates the example interface 200 for the welding-type power supply 100 displaying a total average instantaneous power of a welding-type operation (e.g., via the display device 210) and a duration of the welding-type operation (e.g., via the display device 212). The example interface 200 displays the total average instantaneous power as a sum of the average instantaneous power values calculated for the discrete time periods during the welding-type operation. A user may convert the total average instantaneous power value to a value used in PQRs and WPSs, such as power or heat input per inch, by dividing the displayed total average instantaneous power value by a length of the weld (or weld pass), as measured by the user. Additionally or alternatively, the user may convert a net average instantaneous power value to a value used in PQRs and WPSs, such as power or heat input per inch, by multiplying the net average instantaneous power displayed on the display device 210 by the weld duration displayed on the display device 212, and dividing the product by a length of the weld.

One or more of the example input devices 202-208 may be used to switch the display devices 210, 212 between displaying the total average instantaneous power, the net average instantaneous power, the duration of the welding-type operation, and/or welding parameters.

Figure 3A:
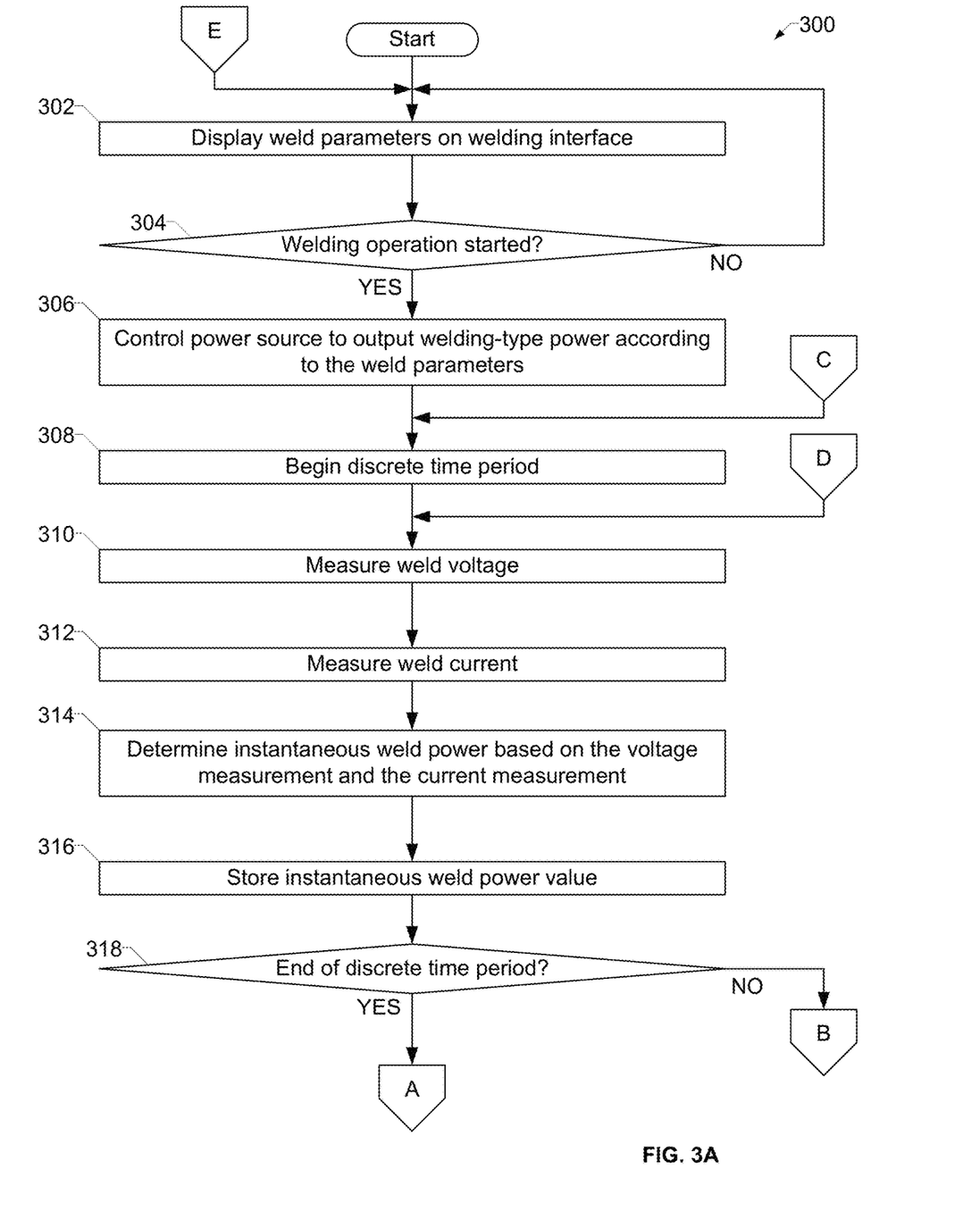
FIGS. 3A, 3B, and 3C illustrate a flowchart representative of an example method to determine a total average instantaneous power for a welding-type operation.
Figure 3B:
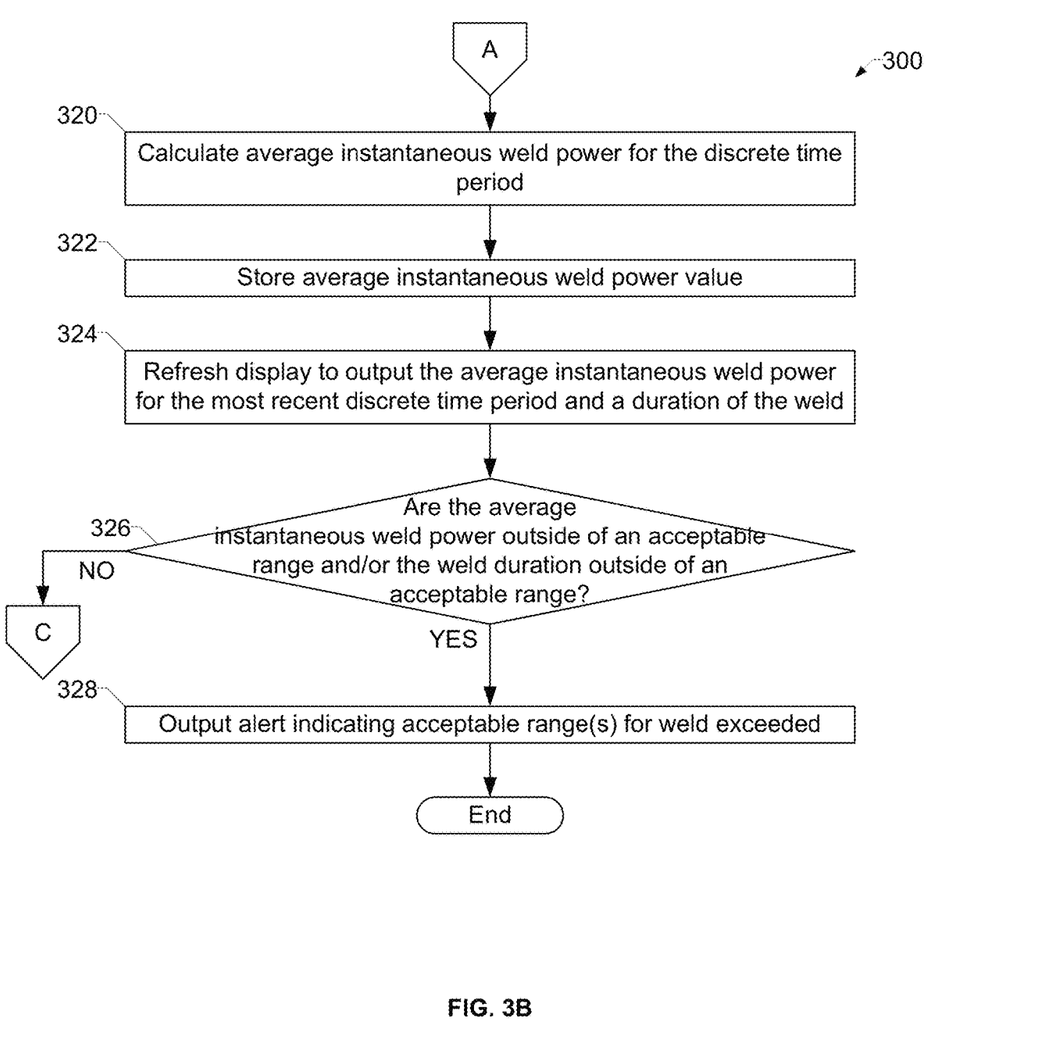
Figure 3C:
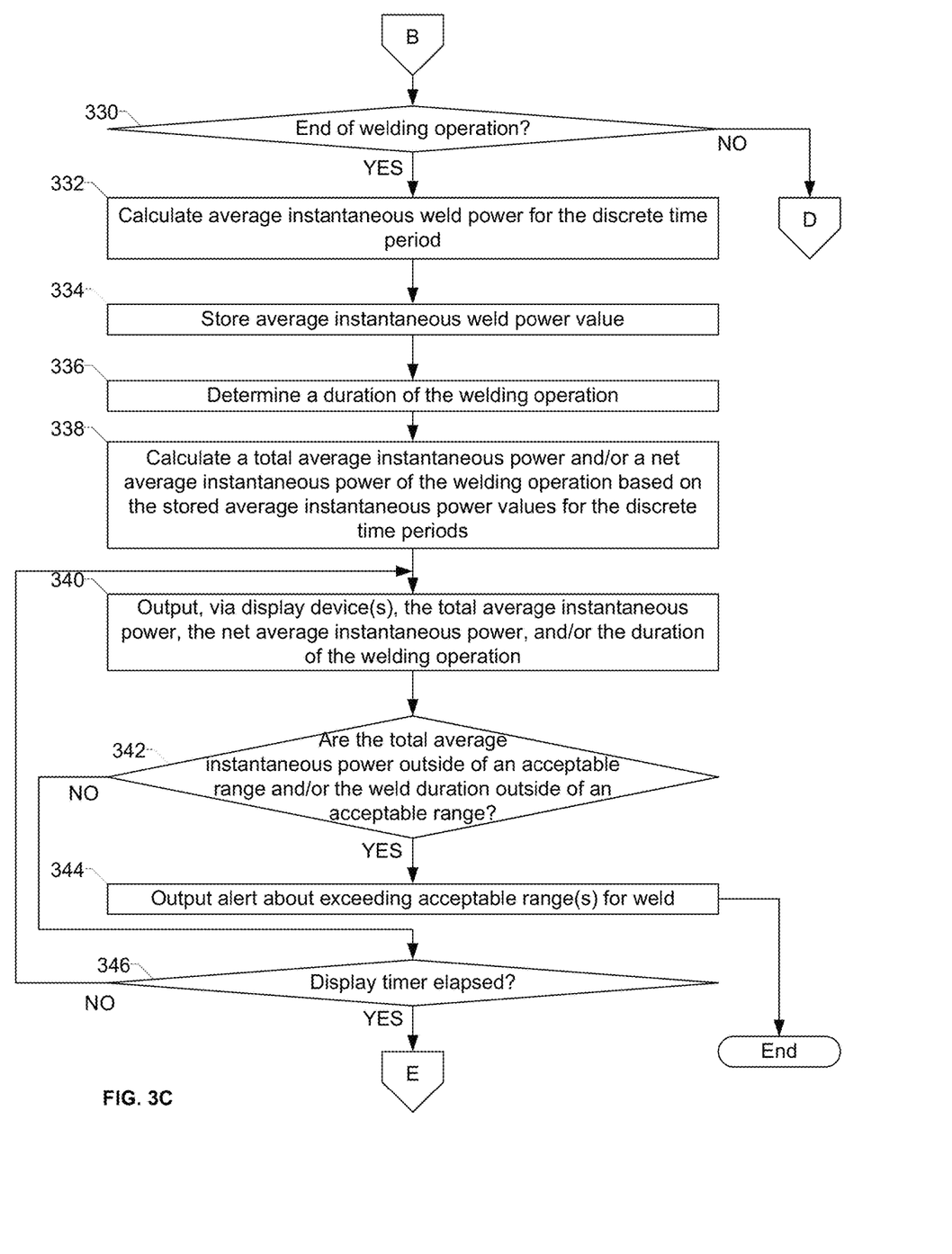

FIGS. 3A, 3B, and 3C illustrate a flowchart representative of an example method 300 to determine a total average instantaneous power and/or a net average instantaneous power for a welding-type operation. The example method 300 may be implemented by the power supply 100 of FIG. 1, such as by the controller 112 executing the machine readable instructions 125 stored in the storage device(s) 123 and/or the memory 124.

At block 302, the controller 112 of FIG. 1 displays weld parameters on a welding interface, such as the display device(s) 116, 210, 212 of FIGS. 1 and/or 2.

At block 304, the controller 112 determines whether a welding operation has started. For example, the controller 112 may identify a trigger pull from a welding torch, receive an arc start signal from a robot controller, and/or identify current flowing from the power converter 110 to the output terminals of the power supply 100 and/or the weld cable 126. If a welding operation is not detected (block 304), control returns to block 302 to continue displaying the welding parameters.

When a welding operation is not detected (block 304), at block 306 the controller 112 controls a power source to output welding-type power (e.g., to the weld cable 126 and/or the work cable 118) according to the weld parameters. For example, the power converter 110 may output weld power at substantially a constant voltage or constant current according to parameters selected via the user interface 114.

At block 308, the controller 112 begins a discrete time period. The controller 112 may start or reset a timer for the discrete time period, and/or mark a beginning time on a running timer and identify a corresponding ending time for the discrete time period based on the length of the discrete time period and the beginning time.

At block 310, the controller 112 measures a weld voltage. In some examples, the controller 112 receives an analog or digital signal from a voltage sensor. At block 312, the controller 112 measures a weld current. For example, the controller 112 may receive an analog or digital signal from a current sensor. In some examples, the controller 112 performs blocks 310 and 312 simultaneously to obtain an accurate measurement of instantaneous weld power. At block 314, the controller 112 determines an instantaneous weld power based on the voltage measurement and the current measurement. For example, the controller 112 may multiply the voltage and the current to determine the power.

At block 316, the controller 112 stores the instantaneous weld power value. For example, the controller 112 may store the instantaneous weld power value in the memory 124 and/or the storage device 123 for later use, and/or update a running average instantaneous weld power value for the discrete time period using the calculated instantaneous weld power value.

At block 318, the controller 112 determines whether the discrete time period has ended. For example, the discrete time period may end when a predetermined value is reached for an applicable timer (e.g., as determined in block 308 at a beginning of the time period).

Turning to FIG. 3B, if the discrete time period has ended (block 318), at block 320 the controller 112 calculates an average instantaneous weld power for the discrete time period. For example, the controller 112 may average the instantaneous weld power values calculated (block 314) and stored (block 316) during the time period. In some examples, the average instantaneous weld power is calculated on an ongoing basis during the time period (e.g., block 320 is time integral). At block 322, the controller 112 stores the average instantaneous weld power value for the time period. For example, the controller 112 may store the average instantaneous weld power value in the memory 124 and/or the storage device 123 for later use, and/or update a running average instantaneous weld power value for the welding operation using the average instantaneous weld power value.

At block 324, the controller 112 refreshes a display (e.g., the display device(s) 116 of FIG. 1) to output the average instantaneous weld power for the most recent discrete time period (e.g., calculated in block 320) and a current duration of the weld.

At block 326, the controller 112 determines whether the average instantaneous weld power for the discrete time period is outside of an acceptable range for the average instantaneous weld power and/or whether the running weld duration is outside of an acceptable range for the weld duration. For example, the controller 112 may determine whether the average instantaneous weld power exceeds an upper limit for a discrete time period or is less than a lower limit for the discrete time period, while permitting some variation between discrete time periods. The controller 112 may additionally or alternatively determine whether the weld duration is outside of an acceptable range.

If the average instantaneous weld power for the discrete time period and/or the weld duration are outside of an acceptable range (block 326), at block 328 the controller 112 outputs an alert indicating that an acceptable range of the weld is exceeded, and the method 300 ends. For example, the controller 112 may output an audio or visual alert via the user interface 114 and/or the display device(s) 116.

If the average instantaneous weld power for the discrete time period and/or the weld duration are within the acceptable range(s) (block 326), control then returns to block 308 to begin another discrete time period.

Turning to FIG. 3C, if the discrete time period has not ended (block 318), at block 330 the controller 112 determines whether the welding operation has ended. For example, the controller 112 may determine whether a trigger has been released and/or if the weld current has dropped to zero or substantially zero. If the welding operation has not ended (block 324), control returns to block 310.

When the welding operation has ended (block 330), at block 332 the controller 112 calculates an average instantaneous weld power for the final discrete time period. At block 334, the controller stores the average instantaneous weld power value. Blocks 332 and 334 may be implemented in a similar or identical manner to blocks 320 and 322, respectively.

At block 336, the controller 112 determines a duration of the welding operation. For example, the controller 112 may determine a difference between start and end times of the welding operation determined according to a timer.

At block 338, the controller 112 calculates a total average instantaneous power and/or a net average instantaneous power of the welding operation, based on the stored average instantaneous power values for the discrete time periods. For example, the controller 112 may calculate the total average instantaneous power by summing the average instantaneous power values for the discrete time periods. The controller 112 may calculate the net average instantaneous power by determining a weighted average of the average instantaneous power values.

At block 340, the controller 112 outputs the total average instantaneous power, the net average instantaneous power, and/or the duration of the welding operation. For example, the controller 112 may output the total average instantaneous power, the net average instantaneous power, and/or the duration via the display devices 116, 210, 212 of FIGS. 1, 2A, and/or 2B. Additionally or alternatively, the controller 112 may output the total average instantaneous power, the net average instantaneous power, and/or the duration of the welding operation to an external device via the transmitter circuit 136 (e.g., to a remote computing device via a storage The total average instantaneous power may be divided by the weld length (e.g., by the user) to determine the energy input or heat input values per unit length. Additionally or alternatively, the net average instantaneous power may then be multiplied (e.g., by the user) by the duration of the welding operation to convert the net average instantaneous power values to a total energy input, and divided by the weld length to determine the energy input or heat input values per unit length.

At block 342, the controller 112 determines whether the total average instantaneous power is outside of an acceptable range for the total average instantaneous power and/or whether the weld duration is outside of an acceptable range for the weld duration. For example, the controller 112 may determine whether the total average instantaneous power exceeds an upper limit or is less than a lower limit for the total average instantaneous power for the weld. The controller 112 may additionally or alternatively determine whether the weld duration is outside of an acceptable range.

If the total average instantaneous power for the discrete time period and/or the weld duration are outside of an acceptable range (block 342), at block 344 the controller 112 outputs an alert indicating that an acceptable range of the weld is exceeded, and the method 300 ends. For example, the controller 112 may output an audio or visual alert via the user interface 114 and/or the display device(s) 116.

The controller 112 may start a display timer at block 340 to display the total average instantaneous power, the net average instantaneous power, and/or the duration of the welding operation for a predetermined time. If the average instantaneous weld power for the discrete time period and/or the weld duration are within the acceptable range(s) (block 342), at block 346, the controller 112 determines whether the display timer has elapsed. If the display timer has not elapsed (block 346), control returns to block 340. When the display timer has elapsed (block 346), control returns to block 302 of FIG. 3A.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chip. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power supply, comprising:
   a power converter to convert input power to output welding-type power; and
   a controller configured to:
   during a welding-type operation, calculate average instantaneous power values of the welding-type operation for discrete, non-overlapping time periods by multiplying voltage measurements and corresponding current measurements;
   identify an end of the welding-type operation;
   determine a duration of the welding-type operation;
   calculate a total average instantaneous power of the welding-type operation based on the average instantaneous power values for the time periods and the duration of the welding-type operation; and
   determine whether an acceptable range of the welding-type operation is exceeded based on the total average instantaneous power and the duration of the welding-type operation.

2. The welding-type power supply as defined in claim 1, further comprising a display device, wherein the controller is configured to output at least one of a first value representative of the total average instantaneous power or a second value representative of the weld duration via the display device.

3. The welding-type power supply as defined in claim 2, wherein the controller is configured to output the at least one of the first value or the second value via the display device for a predetermined duration.

4. The welding-type power supply as defined in claim 3, wherein the controller is configured to output a welding parameter value via the display device after the predetermined duration has elapsed.

5. The welding-type power supply as defined in claim 3, wherein the controller is configured to alternate outputting the first value with outputting the second value during the predetermined duration.

6. The welding-type power supply as defined in claim 2, wherein the controller is configured to display the average instantaneous power values via the display device during the welding-type operation.

7. The welding-type power supply as defined in claim 1, further comprising a receiver circuit to receive communications including measurements of at least one of an output voltage or an output current.

8. The welding-type power supply as defined in claim 1, wherein the controller is configured to calculate one of the average instantaneous power values for a first one of the time periods by:
   multiplying a first voltage measurement corresponding to a first time during the first one of the time periods by a first current measurement corresponding to the first time to determine a first power measurement;
   multiplying a second voltage measurement corresponding to a second time during the first one of the time periods by a second current measurement corresponding to the second time to determine a second power measurement; and
   determining the one of the average instantaneous power values for the first one of the time periods based on the first power measurement and the second power measurement.

9. The welding-type power supply as defined in claim 1, wherein the controller is configured to calculate the total average instantaneous power by summing the average instantaneous power values.

10. The welding-type power supply as defined in claim 1, wherein the controller is configured to output an alert in response to determining that the acceptable range of the welding-type operation is exceeded.

11. The welding-type power supply as defined in claim 1, further comprising initializing a timer to determine the duration of the welding-type operation in response to identifying a start of the welding-type operation.

12. A method, comprising:
   outputting welding-type power using a welding-type power supply during a welding-type operation;
   calculating, via a controller circuit of the welding-type power supply, average instantaneous power values of the welding-type operation for discrete, non-overlapping time periods by multiplying voltage measurements and corresponding current measurements;
   storing the average instantaneous power values in a storage device;
   identifying, via the controller circuit, an end of the welding-type operation;
   determining, via the controller circuit, a duration of the welding-type operation;
   calculating, via the controller circuit, a total average instantaneous power of the welding-type operation based on the average instantaneous power values for the time periods and the duration of the welding-type operation; and
   determining, via the controller circuit, whether an acceptable range of the welding-type operation is exceeded based on the total average instantaneous power and the duration of the welding-type operation.

13. The method as defined in claim 12, further comprising capturing the voltage measurements via a voltage sensor and capturing the current measurements via a current sensor.

14. The method as defined in claim 12, wherein the calculating of one of the average instantaneous power values for a first one of the time periods comprises:
   multiplying a first voltage measurement corresponding to a first time during the first one of the time periods by a first current measurement corresponding to the first time to determine a first power measurement;
   multiplying a second voltage measurement corresponding to a second time during the first one of the time periods by a second current measurement corresponding to the second time to determine a second power measurement; and
   determining the one of the average instantaneous power values for the first one of the time periods based on the first power measurement and the second power measurement.

15. The method as defined in claim 12, wherein the calculating of the total average instantaneous power comprises summing the average instantaneous power values.

16. The method as defined in claim 12, further comprising outputting an alert in response to determining that the acceptable range of the welding-type operation is exceeded.

17. A welding-type power supply, comprising:
   a power converter to convert input power to output welding-type power supply; and
   a controller configured to:
      during a welding-type operation, calculate average instantaneous power values of the welding-type operation for discrete, non-overlapping time periods by multiplying voltage measurements and corresponding current measurements;
      identify an end of the welding-type operation;
      determine a duration of the welding-type operation;
      calculate a net average instantaneous power of the welding-type operation based on the average instantaneous power values for the time periods; and
      determine whether an acceptable range of the welding-type operation is exceeded based on the net average instantaneous power and the duration of the welding-type operation.

18. The welding-type power supply as defined in claim 17, further comprising a display device, the controller configured to output at least one of the first value or the second value via the display device.

19. The welding-type power supply as defined in claim 17, further comprising a voltage sensor to generate the voltage measurements from the output welding-type power and a current sensor to generate the current measurements from the output welding-type power.

20. The welding-type power supply as defined in claim 17, wherein the time periods correspond to a display update rate of the welding-type power supply.

* * * * *